US006986107B2

(12) United States Patent
Hanggie et al.

(10) Patent No.: US 6,986,107 B2
(45) Date of Patent: Jan. 10, 2006

(54) DYNAMIC GENERATION OF VISUAL STYLE VARIANTS FOR A GRAPHICAL USER INTERFACE

(75) Inventors: Scott Hanggie, Redmond, WA (US); Justin Mann, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 611 days.

(21) Appl. No.: 10/174,448

(22) Filed: Jun. 18, 2002

(65) Prior Publication Data
US 2003/0231204 A1 Dec. 18, 2003

(51) Int. Cl.
G06F 6/00 (2006.01)

(52) U.S. Cl. .................. 715/815; 345/419
(58) Field of Classification Search ......... 715/801, 715/838, 839, 764, 765, 815; 345/419, 418
See application file for complete search history.

(56) References Cited

U.S. PATENT DOCUMENTS

| 5,905,492 A | 5/1999 | Straub et al. | |
| 6,091,411 A | 7/2000 | Straub et al. | |
| 6,188,399 B1 | 2/2001 | Voas et al. | |
| 6,271,847 B1 | 8/2001 | Shum et al. | |
| 6,504,551 B1 * | 1/2003 | Takashima et al. | 345/649 |
| 6,754,399 B2 * | 6/2004 | Pettigrew et al. | 382/276 |
| 6,864,886 B1 * | 3/2005 | Cavallaro et al. | 345/420 |

* cited by examiner

Primary Examiner—Cao (Kevin) Nguyen
(74) Attorney, Agent, or Firm—Shook, Hardy & Bacon L.L.P.

(57) ABSTRACT

The present invention provides a method for modifying the manner in which a themed computer user interface element is rendered. The method includes obtaining source data defining the rendering attributes of the user interface element. Parameters are then provided for modifying the source data. The source data is then modified in accordance with the parameters to produce transformed source data reflecting the desired rendering attributes for the user interface element. The transformed source data is stored on the computer to enable displaying the user interface element using the transformed source data. The user interface element may then be rendered to, for example, a computer monitor using the transformed source data. The parameters may, for example, direct modifications to the brightness, contrast, color, volume, or other attributes of the source data. The present invention further provides a novel method for creating a color-shifted image from a raster source image that may be associated with a user interface element.

44 Claims, 7 Drawing Sheets

DYNAMIC GENERATION OF VISUAL STYLE VARIANTS FOR A GRAPHICAL USER INTERFACE

CROSS-REFERENCE TO RELATED APPLICATION

Not Applicable.

TECHNICAL FIELD

The present invention relates to a computer system and, more particularly, to a method for dynamically modifying the visual appearance or other attribute of a themed graphical user interface.

BACKGROUND OF THE INVENTION

Modern personal computers are supplied with an operating system having a "shell." The shell is software that enables a user to interact with the operating system. It can be a part of the operating system software or separate therefrom. The shell normally facilitates this interaction using a graphical user interface, which is commonly implemented using a desktop metaphor within a windowing environment that may include visual or audio interface feedback in the form of animations, sound or music clips, and other constructs.

As with the top of an actual desk, the desktop of the graphical user interface normally has an underlying background, or wallpaper, on which appear various desktop objects. Using a pointing device, such as a mouse, a user can select a desktop object shown on the computer monitor to direct the operating system to perform a desired task.

The windowing environment displays one or more delineated areas on the computer monitor each known as a window. A window is normally under the control of an application or the operating system. The standard window contains certain graphical elements that contribute to its appearance, such as borders and controls. A control generally enables a user to input data to, or obtain information from, the operating system or the control's parent window, which is usually associated with an application. Controls include graphically represented, push buttons, check boxes, text input boxes, list boxes, scroll bars, toolbars and similar constructs.

The operating system itself may present the user with certain controls and other graphical user interface elements such as icons and cursors. For example, the graphical user interface may provide a task bar containing a start button and a system tray that enable the launch of desired applications. Audio clips and animations are also commonly implemented user interface elements. Each element has desired default attributes.

As graphical user interfaces became widely adopted, users sought more control over the appearance and other attributes of the desktop. Software manufacturers responded with software designed to enable desktop customization. The MICROSOFT WINDOWS 95 PLUS PACK product introduced the concept of a "theme" for the MICROSOFT WINDOWS operating system products from the Microsoft Corporation of Redmond, Wash. In this context, a "theme" is a group of icons, sounds, cursors, wallpaper, screen savers, fonts, screen colors and changes to other system metrics, customized to reflect a given subject. For example, the WINDOWS 95 PLUS PACK includes a Leonardo daVinci theme to create a desktop appearance evocative of daVinci's work. The PLUS PACK enables the operating system to read a theme file containing data, such as the file names for the resources comprising the theme, and to display the theme by loading these resources.

Theming was an important advance that quickly gained popularity among users. The theme itself is created by a theme author, who typically uses graphics and/or sound editing software to design source data for the selected theme, and is intended to replace the system default attributes of one or more user interface elements. The complexity of the authoring process and the skills required make theme creation beyond the capabilities of many users. The common user is otherwise restricted to changing a limited number of aspects of the desktop, such as the color and/or width of a window border or the font size and typeface used. Apart from such color, font and limited metrics adjustment, the theme does not fundamentally change the manner in which user interface elements are rendered.

The subsequent development of "visual style" technology extended theming capabilities, allowing significant modification of the visual appearance of windows and controls. MICROSOFT WINDOWS XP operating system product incorporates the visual style technology, and developers are able to create "theme aware" applications employing controls and window areas whose appearance automatically reflect the visual style in effect. This advance was particularly useful because it enables personal computer operating systems to alter the appearance of graphical user interface elements without requiring the development of unique rendering logic for each new visual style, either in the operating system itself or in software applications hosted by it. The visual style technology is well-suited to user interface designs using visually rich source images, such as hand-rendered raster and vector images, which can impart an attractive tactile, three-dimensional or even photo-realistic quality.

The increased flexibility and improved appearance of user interface elements tend to make theme authoring more complex. An average visual style can contain hundreds of source images, along with a number of properties, or attributes associated with each themed user interface element describing how to render the element. Creating, duplicating and hand modifying potentially hundreds of source images and assigning and editing attributes for each to produce a single, consistent visual style variation can take a team of experienced graphic designers weeks or months. Moreover, users increasingly demand flexibility in the appearance of a desktop and the associated windowing environment. Even after a theme author has completed the authoring process, the number of potential permutations on the theme that a user might wish to implement is so high as to prohibit the creation and storage of each possible variation. Furthermore, the act of adding variation via the theme authoring process to a thoroughly tested visual style risks destabilizing the operating system or software applications. For example, a key property value may be unintentionally omitted or assigned an inconsistent value. In summary, both theme authors and users, are largely unable to dynamically and easily modify the appearance of user interface elements defined by a visual style because of the complexities of a complete visual style definition.

SUMMARY OF THE INVENTION

The present invention addresses the limitations in the existing theming technology by providing a method for dynamically modifying the appearance or other attributes of a user interface element whose rendering is governed in part by source data. The method includes first obtaining the source data, such as from a file. Such source data may include, for example, a bitmap image, a vector image, audio data, animated metadata or other data. Parameters are then obtained from the theme author, the operating system, a software application, the user, or any combination thereof, for modifying the source data. The source data is subsequently modified in accordance with the parameters to produce transformed source data reflecting the desired attributes for the user interface element. The user interface element is then rendered, for example, on a computer monitor or audio output device using the transformed source data.

The parameters may direct a variety of desirable modifications for the source data. The present invention introduces the sequence and mechanism for dynamically transforming visual style source data, without regard to the specific data format or its mode of rendering. Thus, using the approach described by the invention, dynamic generation of variation can be applied to a variety of source data, including raster and vector images, sound data, and animation metadata.

For example, the present invention contemplates transforms applied to raster image data that enable dynamic adjustment of the brightness and contrast of the source data controlling the appearance of the user interface element. Similarly, a transform could be applied that performs a merge of the raster data from the source data with a color or texture derived from a secondary raster image to create transformed source data presenting a desired appearance. In particular, the present invention provides a unique color-shifting method for adjusting the colors associated with the source data or with any other graphical image while preserving subtle visual features of the image contained in the source data.

The method is implemented by providing a computer having an operating system adapted to render theme aware user interface elements. User interface elements include objects such as, but not limited to, controls and the graphical parts thereof. Such an operating system contains a theme definition interpreter, theme loader and a theme rendering engine. A theme file is provided containing data describing attributes of a user interface element whose rendering is controlled at least in part by source data. The attributes specified by the theme file are interpreted by the theme definition interpreter and the source data loaded into the computer's memory by the theme loader. The source data, such as, raster image pixels for a visual user interface element, is obtained from the memory hosting the theme's loaded resources. Parameters for changing the appearance of the source data are obtained, such as from a user. The source data is modified in accordance with the parameters. Alternatively, this transformation may be performed as the theme file loader is loading the theme data, including the source data, into memory.

The parameters may modify the manner in which the source data is rendered in a variety of ways. For example, the brightness, contrast, volume, rendering speed, or color imparted by source data may be modified using any number of specific methodologies for data manipulation. Similarly, the source data may be merged with other data to produce a composite, which is subsequently rendered as part of the visual style. For example, a raster source image may be combined with another to produce transformed source data that is textured or otherwise desirably altered in appearance. As applied to raster image source data, the present invention further contemplates a novel color shifting transformation to create a color-shifted image from source data. This transformation may be used to modify the source data for a user interface element or for other images.

Additional advantages and novel features of the invention will be set forth in the description which follows, and in part will be apparent to those skilled in the art upon examination of the following, or may be learned by practice of the invention.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
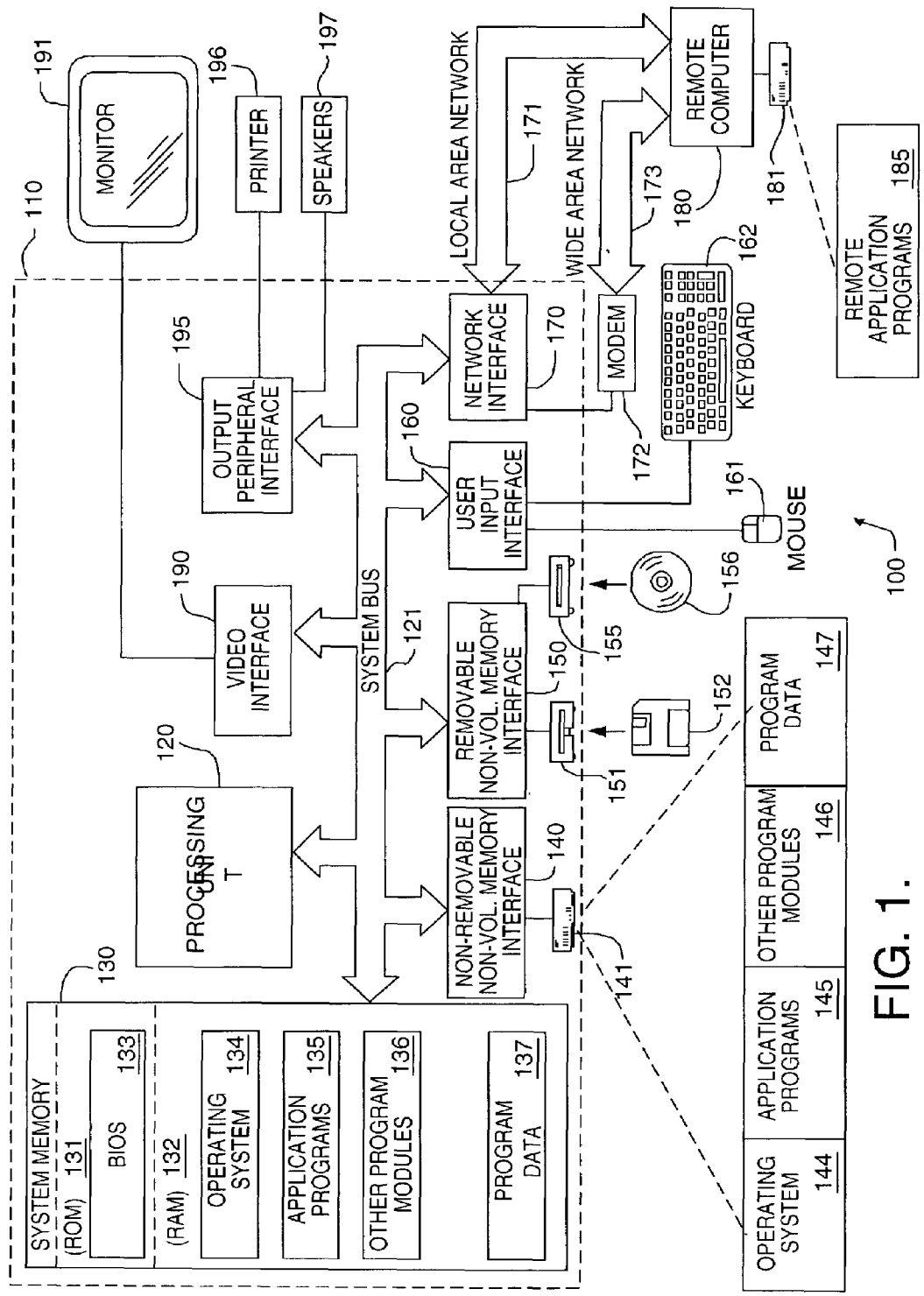
FIG. 1 is a block diagram of a computing system environment suitable for use in implementing the present invention on a computer.

The present invention provides a method that enables the rendering behavior of graphical user interface elements to be dynamically and easily modified while the user interface is being rendered. The graphical user interface includes visual interface elements whose appearances are in part determined by source data, such as bitmap images. In accordance with the method, the present invention obtains source data, such as from a bitmap defining source image pixels. Pixels are the individual points that make up a graphical representation of an image on a display device, such as a computer monitor, usually defined by a number of individual color channels. The source data containing the image may be provided as an individual computer file in a variety of formats, including the well-known bitmap image format. After obtaining the image, the present method obtains parameters for changing the appearance of the source data. Such parameters can include directives that manipulate the brightness, contrast or color of the image to be modified. The present method then modifies the source data as directed by the parameters to produce transformed source data, which in turn is used to render the user interface element, thereby causing the graphical user interface to have a modified appearance.

The present invention's method of obtaining and employing parameters in data manipulation methodologies to produce controlled variation in the manner in which a themed user interface element is rendered applies to theme source data other than raster images. For example, the height, width or other aspects of one or more text fonts in a visual style could comprise source data and be uniformly modified to accommodate user preference or features of the display device. Similarly, various parameters of audio source data associated with a theme could be manipulated using any number of known transforms prior to playback. Together, the invention allows a significant increase in the flexibility and customization potential of a user interface theme.

Another aspect of the present invention provides a novel color-shifting method to create a color-shifted image from a raster source image. This transformation is well suited to the task of modifying the color of an image in the source data for a user interface element or for other images. This color shifting is performed by obtaining source data, such as a bitmap image, defining source image pixels. For each of a number of the source image pixels, the present invention derives three pixels. The first pixel is a copy of the original pixel from the source data. The second pixel is a copy of the first pixel with the color channel information shifted in a direction, either left or right, by one position. The third pixel is a copy of the first pixel with the color channel information shifted by two positions in the same direction as for the second pixel. Each of the color channel values in each of the three pixels is multiplied by a different scalar provided by the user, an application or the operating system to obtain a resulting value for each color channel in each pixel. The resulting values for a given color channel for the first, second and third pixels are then summed to produce a color-shifted output pixel. The resulting output pixels constitute the color-shifted image and the transformed source data subsequently used to render the target user interface element.

Having briefly described an embodiment of the present invention, an exemplary operating system for the present invention is described below.

Exemplary Operating Environment

FIG. 1 illustrates an example of a suitable local computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180.

The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Generation of Visual Style Variants

The present invention may be implemented using a personal computer having operating system software, such as the MICROSOFT WINDOWS XP operating system product, that provides a windowing environment and a graphical user interface employing source data to define the rendering of user interface elements. A user interface element is a control or portion of a window. Themeable user interface elements include controls such as a graphically displayed push button, combo box, edit control, list view control, menu popup, progress indicator, spin button, start panel, taskbar, tool tips, tree controls and similar constructs, and the text displayed therein. Portions of a window may likewise comprise a user interface element, such as the caption and frame, the minimize, restore, maximize and close buttons, the scroll bars and similar items. When a theme is enabled for the user interface, each of these elements may have one or more associated source data files that in part define its appearance and/or other aspects of its behavior. For visual appearance, the source data may be a raster image, vector drawing or animated metadata, or a combination thereof. Source data in this context likewise contemplates audio data. As will be understood by those skilled in the art, a themeable operating system has a theme loader component for transferring information from a theme file into a location in the computer's memory that enables the computer to display themeable portions of the user interface in accordance with the theme. The operating system has a theme rendering engine to provide lower-level display or output services for the themeable user interface elements in accordance with the stored theme data. In general, the method of this aspect of the present invention operates on the theme data stored in memory or on the theme data as it is being transferred by the theme loader.

Figure 2:
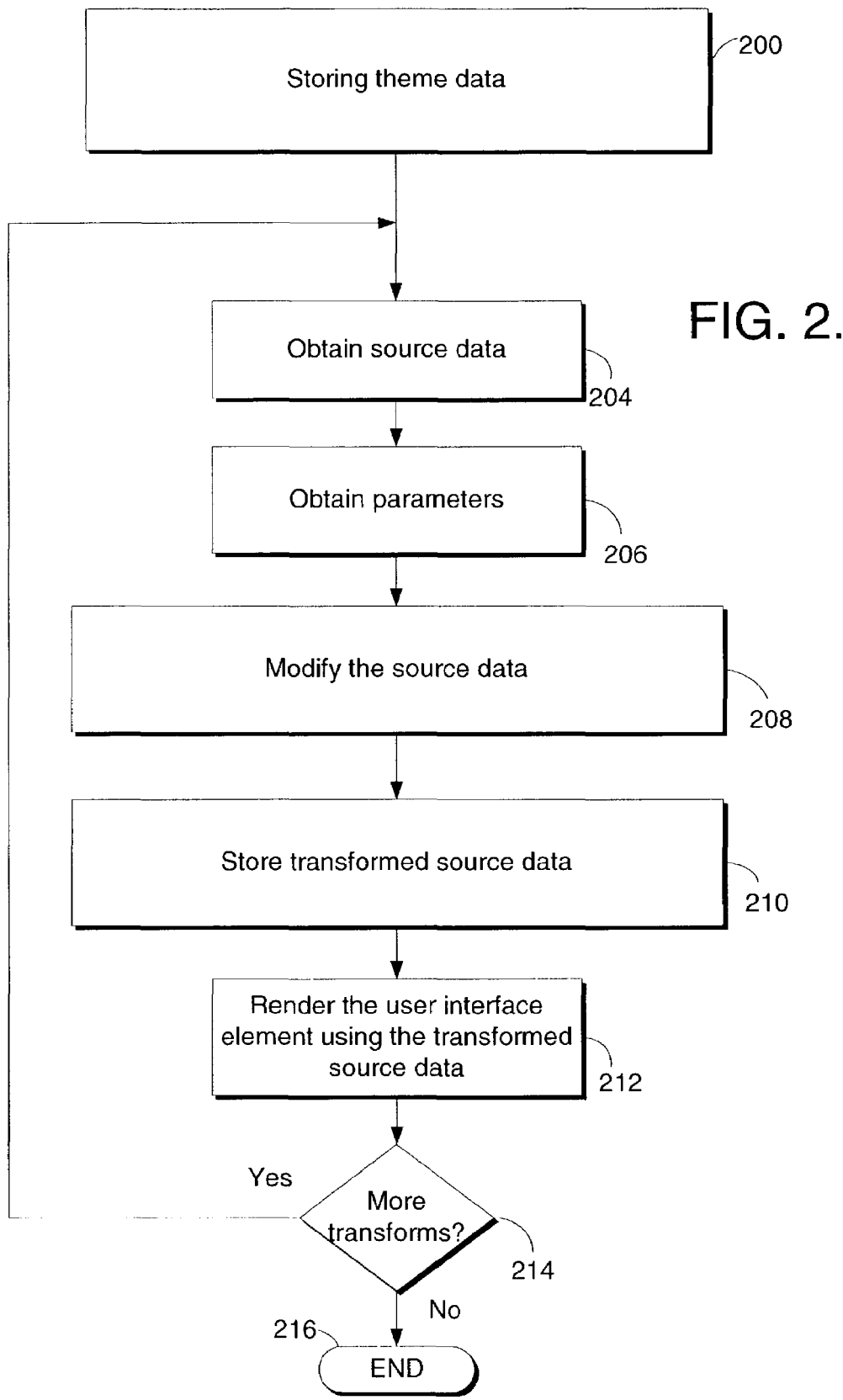
FIG. 2 is a flow chart illustrating an overview of the present invention.

The method may be implemented in a variety of ways, such as by comprising a portion of the operating system source code or as an application written in a programming language, such as C++. FIG. 2 is a flow chart illustrating one embodiment. As shown at step 200, theme data is stored on the computer describing a user interface element whose rendering is determined in part by source data. As noted above, this operation can be accomplished by the existing theme loader portion of an operating system or in any other manner. As will be known and understood by those skilled in the art, the theme loader parses the theme file to extract desired information and then stores the extracted theme data in a portion of the computer's memory, or theme memory, that can be accessed or modified by the operating system or a separate application. Theme files can be defined and assembled using any of a variety of formats. For example, a theme file could use a human-readable text format, such as the well-known Extensible Markup Language (XML) format, to describe the source data and other parameters of the theme. An excerpt from an XML-format theme definition referencing, for example, theme data for a themeable push button user interface element might appear as follows:

```
- <rasterimage>
    <ImageFile MinSize="10, 5">button.bmp</ImageFile>
    <imageCount>5</imageCount>
    <ImageLayout>vertical</ImageLayout>
    <SizingMargins>8, 8, 9, 9</SizingMargins>
    <sizingType>Stretch</sizingType>
    <FillColorHint>176, 204, 208 </FillColorHint>
    <BorderColorHint0, 64, 98</BorderColorHint>
    <AccentColorHint220, 234, 220</AccentColorHint>
  </rasterimage>
``` wherein "button.bmp" in the second line of this excerpt is a reference to source data comprising an image that in part defines the appearance of the push button. The human-readable, XML-based theme definition file may in turn be processed by a compiler tool to produce a more compact and efficient binary file format. After the theme data has been stored on the computer in similar fashion, the present invention, at step 204, obtains source data for the user interface attribute to be modified, normally by accessing such data from the memory location containing the theme data. For a raster image, source data will normally in part define color pixels comprising a source image. Similarly, the source data constituting the rendering information for other data formats are obtained in like manner. Alternatively, depending upon the theme loader characteristics, rendering data could be obtained directly from the theme file or other file containing the source data.

Control then passes to step 206 at which point parameters are obtained for manipulating the source data rendering behavior. Such parameters include, for example, directives to change the brightness, contrast, color, volume or other rendering attributes of the user interface element source data. Examples of several possible transformations are discussed more fully below.

As can be understood by those skilled in the art, the parameters may be obtained in a variety of ways, such as by presenting a user with a dialog box soliciting user input. The dialog box could have a list box control, a preview pane and another control for selecting the desired parameter. The list box control could display a list of current themes or individual user interface elements for which parameters could be accepted. A user could select one or more items from the list box control for transformation. Another control, such as an edit control, a spin button or a slider control, could be provided to allow a user to easily select and input parameters depending upon the transformation desired. For example, a slider control could be provided to allow a user to supply parameters for modifying the brightness of an individual user interface element or of all themeable user interface elements for a given theme that are defined in part by a source image. A preview pane could optionally be included in the dialog box to provide an initial representation of the transformed source data to enable confirmation of whether the prospective transformation is desired.

Alternatively, one or a set of parameters may be obtained from a resident software application or the operating system itself. The parameters may be stored in a disk file, or transferred via system memory. In such instances, the user may or may not participate in the selection of the parameters depending on the purpose, nature and degree of the transformations, and at the discretion of the provider.

After the parameters have been obtained, control passes to step 208 at which point the source data is modified as directed by the parameters to produce transformed source data. Certain examples of modifications or transformations pertaining to raster image source data are provided below with reference to FIGS. 3–7. A transform could be directed to all or a subset of the source data depending on the purpose, nature and degree of the transform. The transformed source data is then stored in a location on the computer at step 210 in a manner enabling the rendering of the user interface element using the transformed source data in place of the original source data. Such location would include the portion of the computer's memory storing theme data that the operating system or other program references when displaying the user interface elements. The storage location could likewise include persistent storage, such as a hard disk.

Control then passes to step 212 at which point the user interface element is rendered using the transformed source data now stored in the theme memory in place of the original source data. As will be appreciated by those skilled in the art, the step of rendering the user interface element may be accomplished in a variety of ways such as through the use of an operating system adapted to provide a themed user interface and use of a theme rendering engine. In this context, the rendering operation is one that causes the user interface element to be displayed or otherwise made perceptible using the transformed source data. Control then passes to step 214 to determine whether additional transformations are necessary. If so, control can return to step 204 to make a desired number of additional transformations on source data affecting the same or different themed user interface elements using the above methodology. Such further transformations could be necessary, for example, if a single set of parameters were being applied to uniformly modify the appropriate data sources for all user interface elements affected by a given theme. For example, the brightness of all user interface element source data for a given theme could be uniformly modified. If at step 214 there are no further transformations, the method of the present invention can terminate at step 216.

FIG. 2 describes an overview of a method used herein. Source data for user interface elements could be modified in a vast number of ways. For example, source data comprising an audio file could be transformed in a desired manner, such as by adding an echo effect to the sound data. Methods for transforming raw audio data are known to those skilled in the art. Other transforms contemplated herein include transforming visual aspects of the user interface elements, such as by modifying a vector image or animation metadata used to render a graphical user element. As examples, and not by way of limitations, certain examples of steps 206 and 208 are provided below with reference to FIGS. 3–7 concerning additional possible transformation to the visual appearance of a user interface element.

Figure 3:
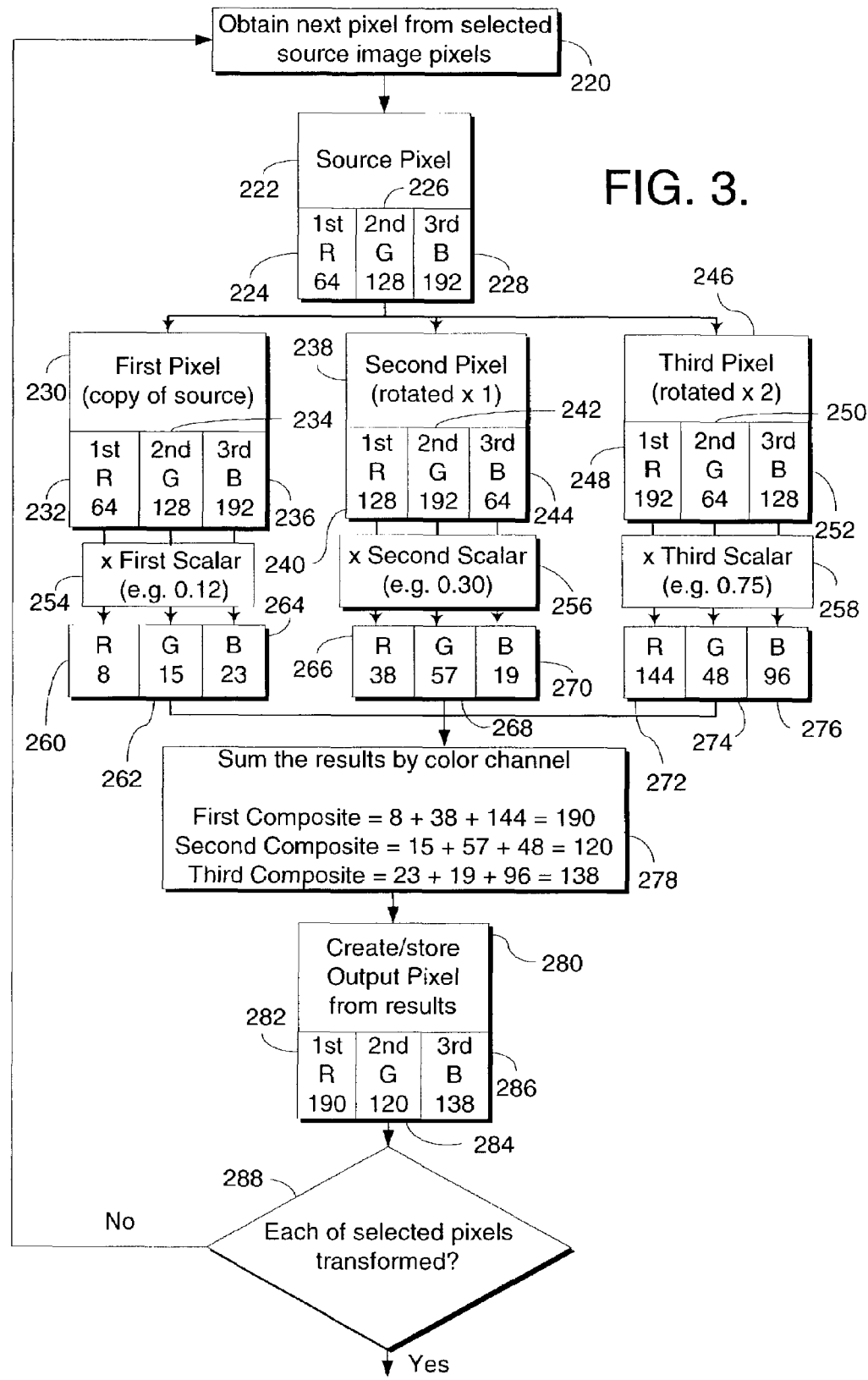
FIG. 3 is a continuation of FIG. 2 illustrating a novel color-shifting transformation of the present invention.

FIG. 3 illustrates a novel color-shifting embodiment. This technique lends itself well to the colorization task by preserving detail in highlight and shadow areas of the source image. The novel color shifting method may be used to transform source data for a user interface element that includes an image as well as images used in other graphical applications. In short, the source data to be transformed defines source pixels to enable its display. For each such source pixel, three pixels are derived. The source pixel as well as the first, second and third pixels each have at least a first color channel, a second color channel and a third color channel, each such color channel storing a color channel value. The first pixel is a copy of the source pixel so that the first pixel has the same respective color channel values as the source pixel. The second pixel is a copy of the source or first pixel with its color channel values shifted in a desired direction by one position. The third pixel is a copy of the source or first pixel with its color channel values shifted in the same desired direction by two positions. The shifting operation may occur in either direction, leftwards or rightwards. For example, when shifting leftwards by one position, the value of first color channel in the target pixel is set equal to the value of the second color channel in the source pixel, the value of the second color channel in the target pixel is set equal to the value of the third color channel in the source pixel, and the value of the third color channel in the target pixel is set equal to the value of the first color channel in the source pixel. Similarly, a two position leftward shifting operation would cause the value of the first color channel in the target pixel to be set equal to the value of the third color channel in the source pixel, the value of the second color channel in the target pixel to be set equal to the value of the first color channel in the source pixel and the value of the third color channel in the target pixel to be set equal to the value of the second color channel in the source pixel. Each of the first, second and third pixel color channel values is multiplied by a respective first, second and third scalar. The resulting values for each color channel are summed to produce a color-shifted output pixel for each source pixel. Processing continues until the source image pixels have been transformed to a desired extent.

The methodology shown in FIG. 3 may be likewise used at steps 206 and 208 in FIG. 2 to effect a transformation on the source data containing an image to color-shift the source image to produce the transformed source data. Alternatively, the transformation described in FIG. 3 and herein may be used independently of modifying source data for a user interface element and may modify graphic source images for other purposes. In this regard, the transformation is accomplished by obtaining source data defining source image pixels for displaying the image. At step 220, each of a number of the source image pixels is selected for processing until the selected number of the source image pixels has been modified in accordance with the desired parameters. As shown in FIG. 3, a source pixel 222 is obtained for processing from the number of the source image pixels. As further illustrated, and not by way of limitation, source pixel 222 is comprised of first color channel 224, second color channel 226 and third color channel 228. These channels are shown using the common "RGB" color channel designation for illustration purposes only. As will be understood by those skilled in the art, other color channel designations exist and could be utilized equally well, such as the "CYM" color channel designation. Pixels having more than three color channels may be likewise used. Each of the color channels 224, 226 and 228 contains a color channel value. For illustration purposes only, color channels 224, 226 and 228 are shown respectively with color channel values of "64," "128" and "192." These values are used in FIG. 3 solely for illustration and in no way limit the range of values that may appear in the respective color channels. For each source pixel, three pixels 230, 238 and 246 are created. The first pixel 230 is a copy of source pixel 222 having three color channels and the same respective color channel values as source pixel 222. Thus, color channel 232 contains the same value as color channel 224, color channel 234 contains the same color channel 226, and color channel 236 contains the same color channel value as color channel 228.

Second pixel 238 is a copy of first pixel 230 with the color channel values of first pixel 230 shifted in a desired direction by one color channel position. This desired direction may be either leftwards or rightwards depending upon the desired transformation. For illustration purposes, FIG. 3 shows the results of a leftward shift, although a rightward shift is within the scope of the present invention. Thus, the value of second pixel third color channel 244 is set equal to the value of first pixel first color channel value 232, the value of second pixel first color channel 240 is set equal to the value of first pixel second color channel 234, and the value of second pixel second color channel 242 is set equal to the value of first pixel third color channel 236.

Similarly, third pixel 246 is a copy of first pixel 230 with the color channel values shifted by two color channel positions in the same direction as was shifted for second pixel 238. Thus, third pixel first color channel value 248 is set equal to first pixel third color channel value 236, third pixel second color channel value 250 is set equal to first pixel first color channel value 232, and third pixel third color channel value 252 is set equal to first pixel second color channel value 234.

Each of the color channel values for pixels 230, 238 and 246 is multiplied by a scalar that can differ for each pixel. The scalar may be selected by a user or provided by an application. It is desirable to use a scalar between −2 and 2 because scalar numbers outside of this range tend to overly bias the transformed source image pixels toward a black or white color. The results of the multiplication operation are then summed for the pixels by color channel to produce composite color channel values. Thus, as can be seen in FIG. 3, the values of color channels 232, 234 and 236 for first pixel 230 are each multiplied by a first scalar 254 to produce respective intervening values 260, 262 and 264. Similarly, for second pixel 238, the values of color channels 240, 242 and 244 are multiplied by a second scalar 256 to produce the respective intervening values 266, 268 and 270. Likewise, for third pixel 246, the values of color channels 248, 250, 252 are each multiplied by a third scalar 258 to produce the respective intervening values for the third pixel 272, 274 and 276. The intervening values 260, 266 and 272 derived from the first color channels are summed at step 278 to yield a composite first color channel value. The intervening values 262, 268 and 274 derived from the second color channels are summed at step 278 to yield a composite second color channel value, and the intervening values 264, 270 and 276 derived from the third color channels are summed to yield a composite third color channel value. An output pixel 280 is created using the composite color channels of step 278. Output pixel 280 has a first output color channel 282, a second output color channel 284 and a third output color channel 286, each of the color channels having a value. The value of first output color channel 282 is set equal to the composite first color channel value of 278. The value of second output color channel 284 is set equal to the composite second color channel value of 278, and the value of third output color channel 286 is set equal to the composite third color channel value of 278. Control then passes to step 288 to determine whether each of the selected number of the source image pixels has been transformed. If not, control returns to step 220 and the above-described process is repeated. On the other hand, if at step 288, the selected number of pixels has been transformed, control passes to step 210 in FIG. 2 to store the modified image as transformed source data and for further processing as discussed above in connection with FIG. 2.

Figure 4:
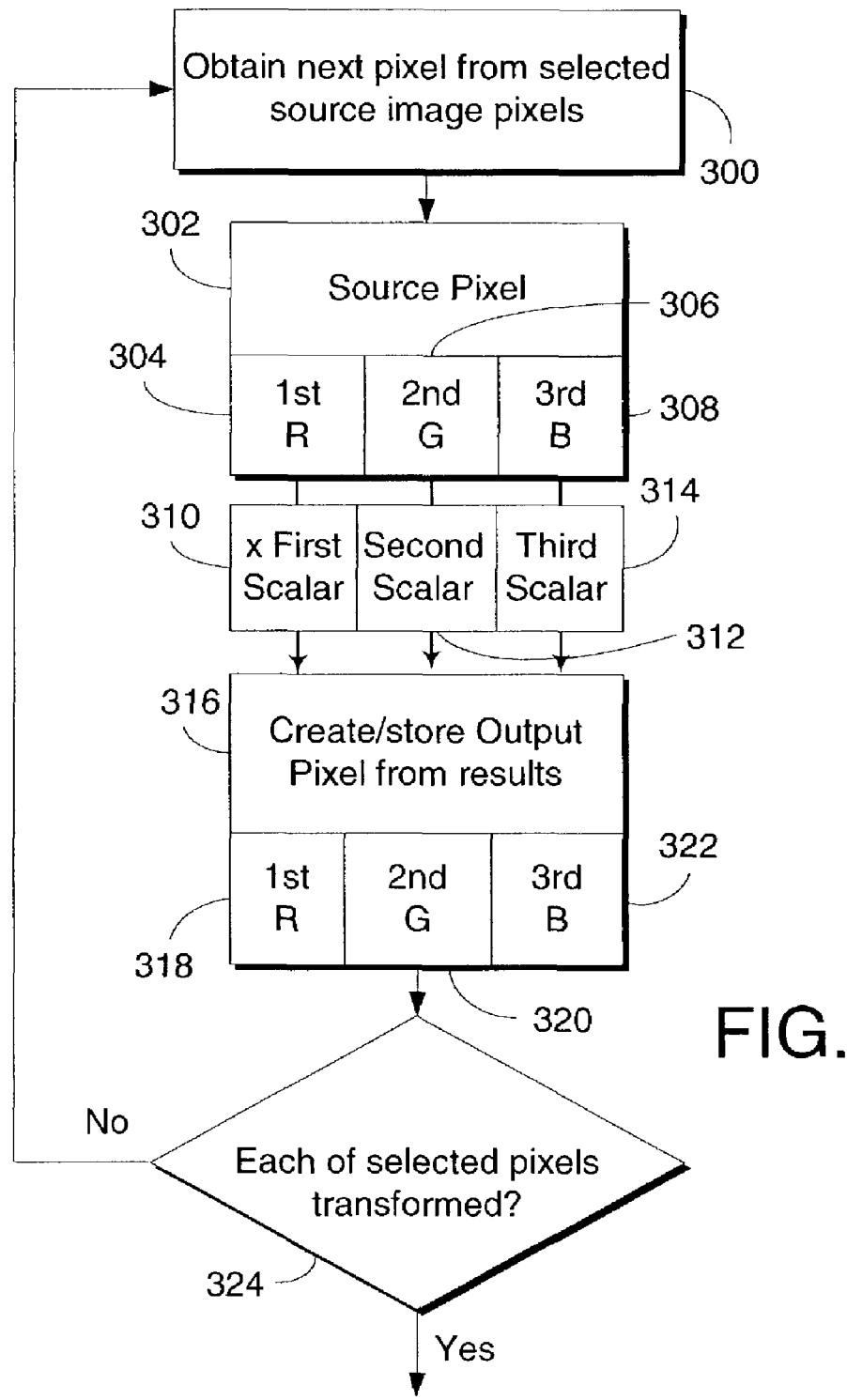
FIG. 4 is a continuation of the flow chart of FIG. 2 illustrating another color-shifting portion of the present invention.

FIG. 4 illustrates an alternative color transformation method that may be applied in connection with steps 206 and 208 in FIG. 2. This transformation is accomplished by obtaining source data for a source image defining source image pixels for displaying the source image. As discussed above, a number of the source image pixels is selected for processing. In applying this transform, each of the selected pixels is processed to produce a corresponding output pixel as follows:

Output Pixel = CombineChannels (First Source Channel Value × first scalar,

Second Source Channel Value × second scalar,

Third Source Channel Value × third scalar)

wherein the CombineChannels function creates a valid RGB value from the specified computed values.

This method shows another way of performing a color shift on a desired source image. In this regard, the method illustrated in FIG. 4 begins by obtaining at step 300 each of a number of the source image pixels. Source pixel 302 has at least three color channels 304, 306 and 308, each having a color channel value, although a differing number of color channels could be provided. The value of the first color channel 304 is multiplied by a first scalar 310 to produce a first output color channel 318 for an output pixel 316. This process is similarly repeated for any remaining color channels. Thus, second color channel 306 is multiplied by a second scalar 312 to produce the second output color channel 320. Third color channel 308 is likewise multiplied by third scalar 314 to produce third output color channel 322. Control then passes to step 324 at which point the method of present invention determines whether each of the selected number of pixels has been transformed. If not, control returns to step 300 and continues processing in the above described manner. On the other hand, if at step 324, the selected number of pixels has been transformed, control passes to step 210 in FIG. 2 to store the transformed source image and for further processing as discussed above in connection with FIG. 2.

Figure 5:
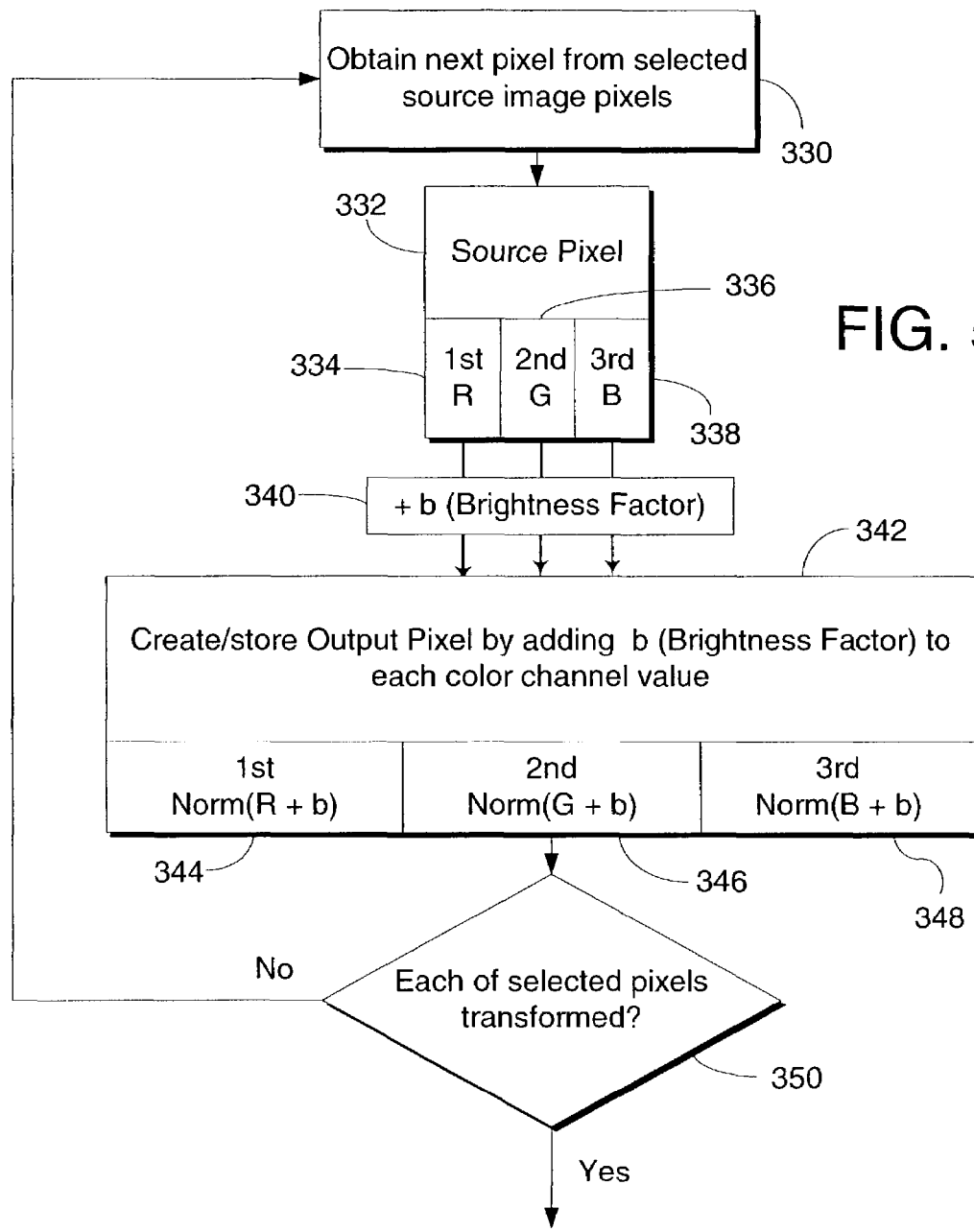
FIG. 5 is a continuation of the flow chart of FIG. 2 illustrating a raster image brightness transformation of the present invention.

FIG. 5 illustrates another modification of the source data that may be performed at steps 206 and 208 in FIG. 2. The method illustrated in FIG. 5 modifies the brightness of an image used to render a user interface element. In this regard, the transformation is accomplished by obtaining source data for an image defining source image pixels for displaying the image. Each of a number of the source image pixels is selected for processing until the selected number of the source image pixels has been modified in accordance with the desired parameters. In applying this transform, a brightness factor—b—is obtained, for example from a user, and each of a number of the source image pixels is processed to produce a corresponding output pixel as follows:

$$\text{Output Pixel} = \text{CombineChannels}$$
$$(\text{Normalize}(\text{First Color Channel Value} + b),$$
$$\text{Normalize}(\text{Second Color Channel Value} + b),$$
$$\text{Normalize}(\text{Third Color Channel Value} + b))$$

Thus, at step 330, each of a number of the source image pixels is obtained from the image data as shown by source pixel 332 having color channels 334, 336 and 338. A brightness factor—b—340 is obtained to reflect the desired amount of brightness or the absence thereof. In general, a brightness factor greater than zero will tend to lighten the original pixel, while a brightness factor less than zero will tend to darken. An output pixel 342 is then created by adding the brightness factor—b—to each color channel value and then normalizing the value to ensure that the resulting color channel value is within an acceptable range. For the well-known 32-bit color representation method, the acceptable range thus would be an integer number between 0 and 255. The normalize function returns a number that is within the proper range for the given color channel. Thus, if addition of the brightness factor—b—to a given color channel would not cause the color channel value to fall outside of its permissible range, the normalize function returns the original value of the color channel plus the brightness factor—b—. If the addition of the brightness factor would cause the color channel value to be less than zero, the normalize function would return zero. Similarly, if a color channel's maximum permissible value were 255 and the addition of the brightness factor would cause the color channel value to exceed 255, the normalize function would return 255. Each of the three color channel values, 344, 346 and 348 are so calculated and normalized. Control then passes to step 350 to determine whether each of the selected number of pixels has been transformed. On the other hand, if at step 350, the selected number of pixels has been transformed, control passes to step 210 in FIG. 2 to store the transformed source image and for further processing as discussed above in connection with FIG. 2.

Figure 6:
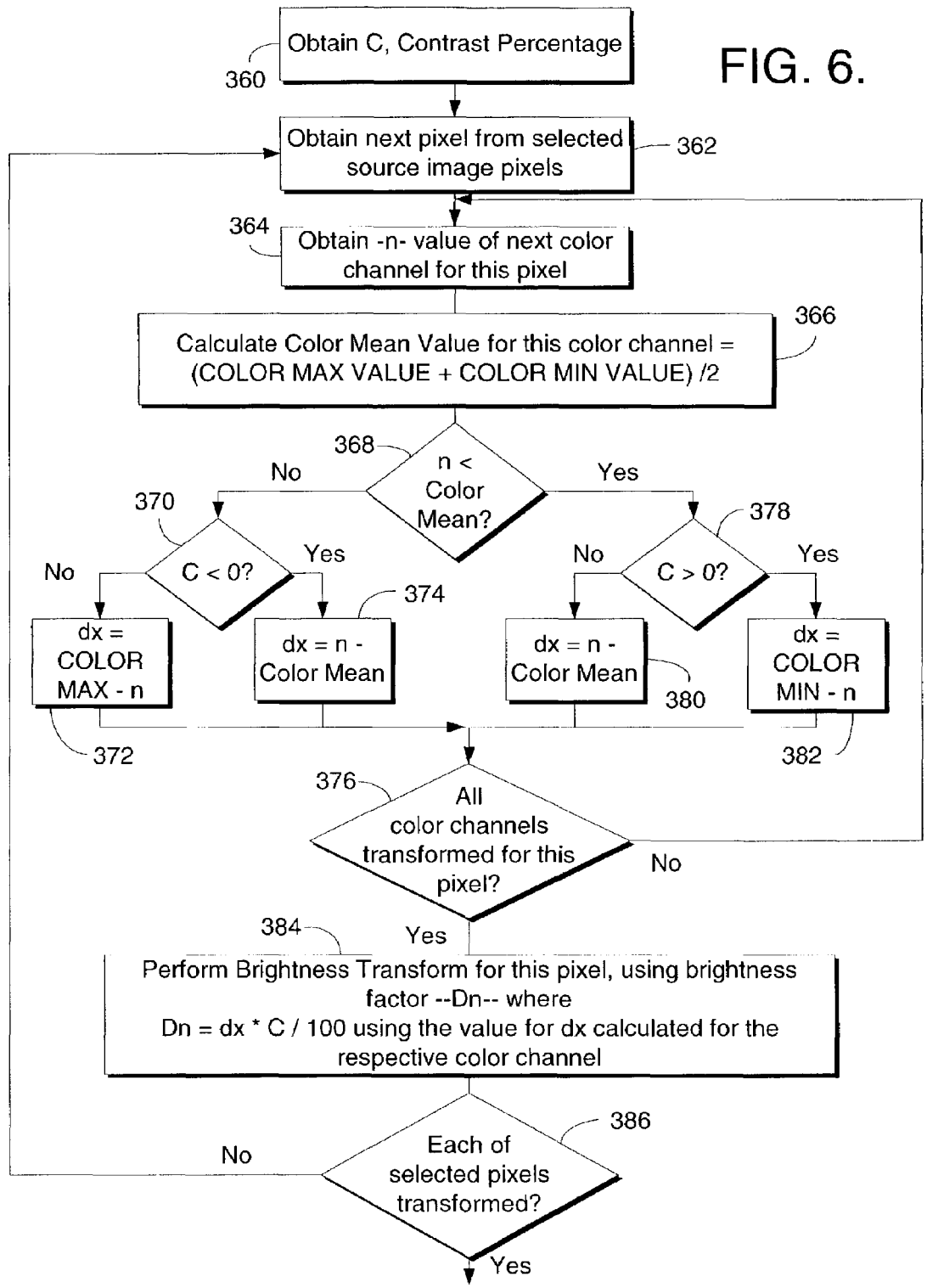
FIG. 6 is a continuation of the flow chart of FIG. 2 illustrating a raster image contrast transformation of the present invention.

FIG. 6 illustrates a further method for performing step 208 in FIG. 2 to modify the source data to produce transformed source data. This particular method modifies the contrast of an image contained in the source data. In this regard, the transformation is accomplished by obtaining source data for an image defining source image pixels for displaying the image. Each of a number of the source image pixels is selected for processing until the selected number of the source image pixels has been modified in accordance with the desired parameters. Thus, at step 360 a contrast percentage parameter—C—is obtained. Each of the selected number of source image pixels is successively obtained at step 362 from the image data and control passes to step 364 whereupon the first color channel value is examined of each source pixel to be processed. At step 366, a color mean value is calculated for the particular color channel by adding the minimum and maximum color channel values together and dividing the resulting sum by two. As will be understood by those skilled in the art, each color channel has a pre-defined minimum and maximum value. For example, a 32-bit color representation has three color channels whose minimum value is zero and whose maximum value is 255. The color mean value would thus be (0+255)/2=127.5 or 128 when rounded. Control then passes to step 368 and determines whether the current color channel value—n—is less than the color mean. If not, control passes to step 370 to determine whether the contrast percentage—C—is less than zero. If not, control passes to step 372 and a calculated color channel value—dx—is calculated by subtracting the current color channel value—n—from the color maximum value for this color channel. If at step 370, the contrast percentage is not less than zero, control passes to step 374 and a color channel value—dx—is calculated by subtracting the color mean from the current color channel value—n—.

On the other hand, if at step 368, the color channel value—n—is less than the color mean, control passes to step 378 and determines whether the contrast percentage—C—is greater than zero. If so, control passes step 382 and a color channel value—dx—is calculated by subtracting the current color channel value—n—from the minimum for this color channel. If, on the other hand, at step 378 the contrast percentage is not greater than zero, control passes to step 380 and a color channel value—dx—is calculated by subtracting the color mean from the current color channel value—n—. Control passes step 376 to determine whether all color channels for the pixel under analysis have been transformed. If not, control returns to step 364 and continues until all color channel values for the pixel have been transformed. If at step 376, all color channels have been transformed for the pixel under analysis, control passes to step 384 wherein the brightness transformation is performed using the value—dx—as calculated for each color channel in place of the brightness factor—b—. In pseudocode, the contrast modifying procedure would be illustrated as follows where—n—is the source color channel value and—C—is the contrast percentage units ranging from –100 to 100. The deviation—dx—is calculated for each color channel as follows:

```
If (n <= Color Mean)
{
    if (C > 0)
            dx = Color Minimum – n
        else
            dx = n – Color Mean
}
else
{
    if (C < 0)
            dx = n – Color Mean
        else
            dx = Color Maximum – n
}
D = dx × C/100
```

To complete the contrast transform, the brightness transform is performed using the variable D shown as D1, D2 and D3 representing the variable D as calculated for the first, second and third color channels respectively:

$$\text{Output Pixel} = \text{CombineChannels}$$
$$(\text{Norm}(\text{First Channel} + D1),$$
$$\text{Norm}(\text{Second Channel} + D2),$$
$$\text{Norm}(\text{Third Channel} + D3))$$

Thus, D1 is added to the value of the source pixel first color channel and the resulting sum is normalized as discussed above. Similarly, D2 is added to the value of the source pixel second color channel and the resulting sum is normalized, and D3 is added to the value of the source pixel third color channel and normalized. The CombineChannels function creates an RGB or similar color value from the normalized results. The output pixel is stored on the computer to form the transformed source data.

Control then passes to step 386 to determine whether substantially all pixels have been transformed. If not, control returns to step 362 to obtain the next pixel for transformation and processing continues. On the other hand, if at step 386, the selected number of pixels has been transformed, control passes to step 210 in FIG. 2 to store the transformed source data and for further processing as discussed above in connection with FIG. 2.

Figure 7:
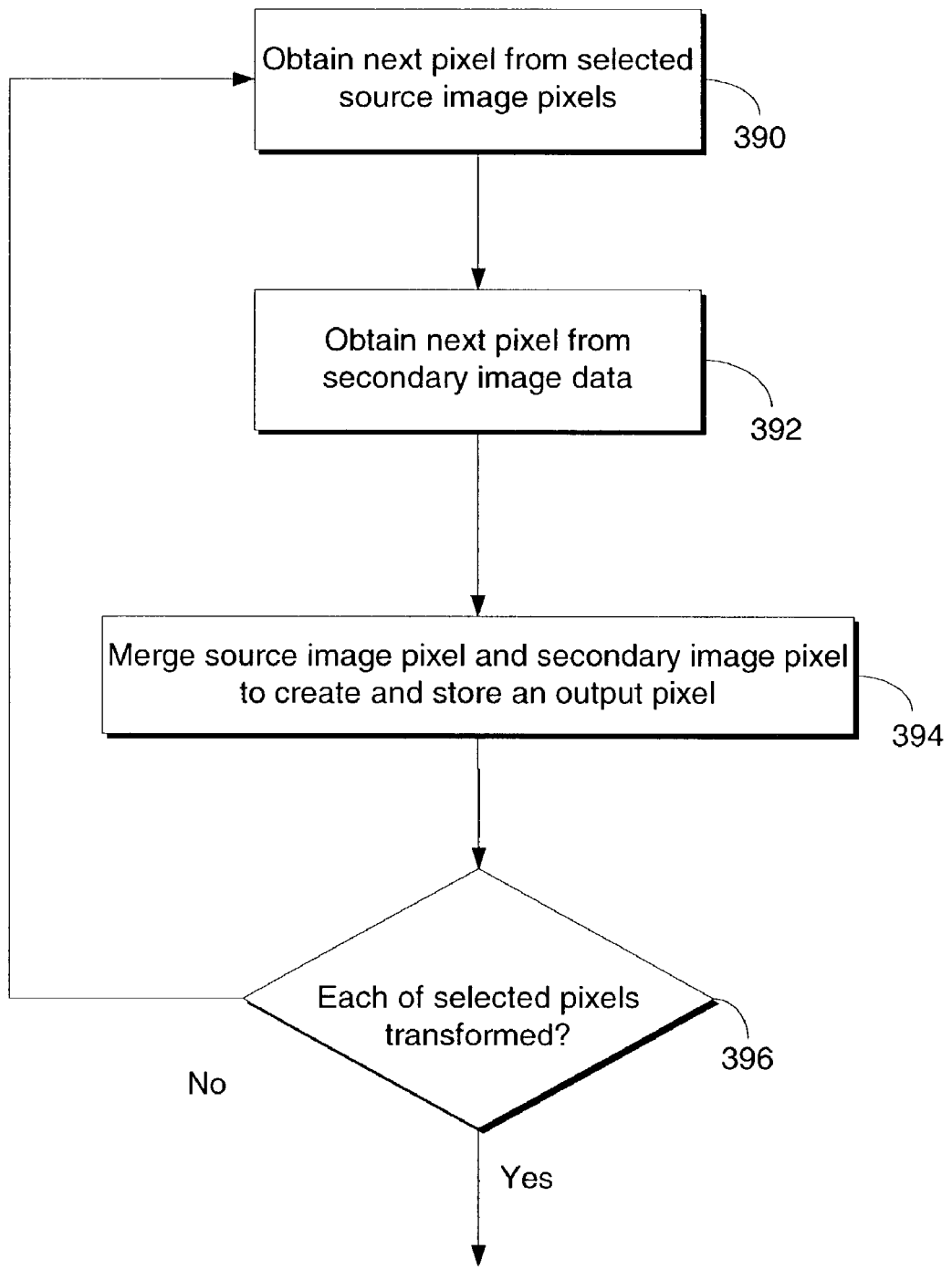
FIG. 7 is a continuation of the flow chart of FIG. 2 illustrating a raster image merge transformation of the present invention.

FIG. 7 illustrates a further transform that may be performed at step 208 in FIG. 2 wherein the source data may be merged with a secondary image to create the transformed source data. In this regard, the transformation is accomplished by obtaining source data for an image defining source image pixels for displaying the image. Each of a number of the source image pixels is selected for processing until the selected number of the source image pixels has been modified in accordance with the desired parameters. At step 390, a next source pixel is obtained from the image data defining a selected number of source image pixels. At step 392, a next secondary pixel is similarly obtained from the secondary image data. Control then passes to step 394, and the source pixel and secondary pixels are merged to create a merged image using methods understood by those skilled in the art. One such method would be as follows:

Output Pixel = *CombineChannels*

$((First_{source} \times First_{secondary})/\text{maximum color channel value},$ $(Second_{source} \times Second_{secondary})/\text{maximum color channel value},$ $(Third_{source} \times Third_{secondary})/\text{maximum color channel value}))$ where First, Second and Third refer to the color channel values of the respective source and secondary pixels and the maximum color channel value represents the maximum permissible value for the given color channel, which for 32-bit color representations is normally 255. The resulting composite image appears visually as a merge of two translucent images. Although the secondary image is not restricted, desirable secondary images may impart tactile qualities and texture variations as well. The CombineChannels function creates an RGB or similar color value from the normalized results. The output pixel is stored on the computer to form the transformed source image. Control then passes to step 396 to determine whether substantially all pixels have been transformed. If not, control returns to step 390 to obtain the next pixel for transformation and processing continues. On the other hand, if at step 396, the selected number of pixels has been transformed, control passes to step 210 in FIG. 2 to store the modified image as the transformed source data and for further processing as discussed above in connection with FIG. 2.

From the foregoing, the invention can be seen to provide software users with a valuable way to modify a themed graphical user interface having user interface elements whose rendering is described at least in part by source data.

The invention provides this method in a manner that does not degrade system performance. By eliminating the need to manage separate data for each element and for each color, texture, sound or other variation, the size of the file containing theme data or visual style information and all of its variations is significantly reduced. Adding a single theme variation using hand-generated visual styles greatly increases the theme file size. This in turn places increased demands on the computer system resource, such as by requiring the loading and parsing of large theme files. These and other disadvantages are thus avoided through use of the present invention.

Alternative embodiments of the present invention may become apparent to those skilled in the art to which it pertains upon review of the specification, including drawing figures. The various computer systems and components shown in FIGS. 1–7 and described in the specification are merely exemplary of those suitable for use in connection with the present invention. Accordingly, the scope of the present invention is defined by the appended claims rather than the foregoing description.

We claim:

1. A computer-implemented method for dynamically modifying the rendering behavior of a graphical user interface on a computer, the graphical user interface including at least a user interface element whose rendering is at least in part determined by source data, comprising:

obtaining one or more parameters for at least one transform to the source data, wherein the source data in part defines source image pixels for displaying a raster image;

modifying the source data as directed by the one or more parameters to produce transformed source data, wherein modifying the source data includes for each of a plurality of the source image pixels:

obtaining from the plurality of the source image pixels a source pixel having a first source color channel, a second source color channel and a third source color channel, each of which contains a color channel value;

multiplying the first source color channel value by a first scalar to yield a composite first color channel value;

multiplying the second source color channel value by a second scalar to yield a composite second color channel value;

multiplying the third source color channel value by a third scalar to yield a composite third color channel value;

creating an output pixel having a first output color channel, a second output color channel and a third output color channel, each of which contains a color channel value, wherein the first output color channel value equals the first composite color channel value, the second output color channel value equals the second composite color channel value and the third output color channel value equals the third composite color channel value; and storing the output pixel on the computer to form the transformed source data; and storing the transformed source data on the computer to enable rendering of the user interface element using the transformed source data rather than the original source data.

2. The method of claim 1, further comprising rendering the user interface element using the transformed source data.

3. The method of claim 1, wherein the step of modifying the source data includes modifying the brightness of a plurality of the source image pixels to produce the transformed source data.

4. The method of claim 1 wherein the step of modifying the source data includes modifying the contrast of a plurality of the source image pixels to produce the transformed source data.

5. The method of claim 1, wherein the step of modifying the source data includes merging the source data with data for a secondary image to produce the transformed source data.

6. The method of claim 1, wherein the source data in part includes audio data.

7. The method of claim 1, wherein the source data in part includes vector image data.

8. The method of claim 1, wherein the source data in part includes animated metadata.

9. A computer-implemented method for dynamically modifying the rendering behavior of a graphical user interface on a computer, the graphical user interface including at least a user interface element whose rendering is at least in part determined by source data, comprising:
obtaining one or more parameters for at least one transform to the source data, wherein the source data in part defines source image pixels for displaying a raster image;
modifying the source data as directed by the one or more parameters to produce transformed source data, wherein the step of modifying the source data to produce the transformed source data includes for each of a plurality of the source image pixels:
obtaining from the plurality of the source image pixels a source pixel having a first source color channel, a second source color channel and a third source color channel, each of which contains a color channel value;
creating a first pixel, a second pixel and a third pixel, each having a first color channel, a second color channel and a third color channel and each respective color channel containing a color channel value,
wherein the values of the first pixel color channels correspond respectively to the first source color channel value, the second source color channel value and the third source color channel value,
wherein the values of the second pixel color channels correspond respectively to the first pixel color channel values shifted in a desired direction by one color channel position; and
wherein the values of the third pixel color channels correspond respectively to the first pixel color channel values shifted in the desired direction by two color channel positions;
creating a composite first color channel value by multiplying the first color channel value of the first pixel by a first scalar, multiplying the first color channel value of the second pixel by a second scalar and multiplying the first color channel value of the third pixel by a third scalar and summing the results thereof to yield the composite first color channel value;
creating a composite second color channel value by multiplying the second color channel value of the first pixel by the first scalar, multiplying the second color channel value of the second pixel by the second scalar and multiplying the second color channel value of the third pixel by the third scalar and summing the results thereof to yield the composite second color channel value;
creating a composite third color channel value by multiplying the third color channel value by the first scalar, multiplying the third color channel value of the second pixel by the second scalar and multiplying the third color channel value of the third pixel by the third scalar and summing the results thereof to yield the composite third color channel value;
creating an output pixel having a first output color channel value, a second output color channel value and a third output color channel value, wherein the first output color channel value equals the first composite color channel value, the second output color channel value equals the second composite color channel value and the third output color channel value equals the third composite color channel value; and
storing the output pixel on the computer to form the transformed source data; and
storing the transformed source data on the computer to enable rendering of the user interface element using the transformed source data rather than the original source data.

10. The method of claim 9, wherein the desired direction is to the left.

11. The method of claim 9, wherein the desired direction is to the right.

12. The method of claim 9, wherein the first scalar, the second scalar and the third scalar each have a value from between −2 and 2.

13. In a windowing environment on a computer, a method for modifying a themeable graphical user interface having a plurality of user interface elements each of whose rendering is at least in part determined by respective source data, comprising:
obtaining one or more parameters for globally modifying each respective source data, wherein the respective source data in part defines one or more data elements;
modifying the respective source data as directed by the one or more parameters to produce for each respective source data respective transformed source data, wherein modifying the respective source data includes for each of said one or more data elements:
obtaining from the one or more data elements a source element having a plurality of channels, wherein each of said plurality of channels contains at least one channel value;
multiplying said at least one channel value by a scalar to yield at least one composite channel value;
creating an output element having a plurality of output channel values, wherein said plurality of output channel values includes said at least one composite channel value; and
storing the output element on the computer to form the respective transformed source data; and
storing the respective transformed source data on the computer to enable rendering the plurality of user interface elements each using the respective transformed source data.

14. The method of claim 13, wherein the source data in part includes audio data.

15. The method of claim 13, wherein the source data in part includes vector image data.

16. The method of claim 13, wherein the source data in part includes animated metadata.

17. The method of claim 13, further comprising rendering the plurality of user interface elements using the respective transformed source data.

18. A computer-implemented method for creating a color-shifted image from source data defining source image pixels viewable using a computer, comprising for each of a plurality of the source image pixels:
 obtaining from the plurality of the source image pixels a source pixel having a first source color channel, a second source color channel and a third source color channel, each of which contains a color channel value;
 creating a first pixel, a second pixel and a third pixel, each having a first color channel, a second color channel and a third color channel and each respective color channel containing a color channel value,
 wherein the values of the first pixel color channels correspond respectively to the first source color channel value, the second source color channel value and the third source color channel value,
 wherein the values of the second pixel color channels correspond respectively to the first pixel color channel values shifted in a desired direction by one color channel position; and
 wherein the values of the third pixel color channels correspond respectively to the first pixel color channel values shifted in the desired direction by two color channel positions;
 creating a composite first color channel value by multiplying the first color channel value of the first pixel by a first scalar, multiplying the first color channel value of the second pixel by a second scalar and multiplying the first color channel value of the third pixel by a third scalar and summing the results thereof to yield the composite first color channel value;
 creating a composite third color channel value by multiplying the second color channel value of the first pixel by the first scalar, multiplying the second color channel value of the second pixel by the second scalar and multiplying the second color channel value of the third pixel by the third scalar and summing the results thereof to yield the composite second color channel value;
 multiplying the third color channel value of the second pixel by the second scalar and multiplying the third color channel value of the third pixel by the third scalar and summing the results thereof to yield the composite third color channel value;
 creating an output pixel having a first output color channel value, a second output color channel value and a third output color channel value, wherein the first output color channel value equals the first composite color channel value, the second output color channel value equals the second composite color channel value and the third output color channel value equals the third composite color channel value; and
 storing the output pixel on the computer to form the color-shifted image.

19. The method of claim 18, further comprising displaying the color-shifted image on the computer.

20. The method of claim 18, wherein the desired direction is to the left.

21. The method of claim 18, wherein the desired direction is to the right.

22. The method of claim 18, wherein the first scalar, the second scalar and the third scalar each have a value between −2 and 2.

23. A computer-readable medium having computer-executable instructions for a computer to perform a method for dynamically modifying the rendering behavior of a graphical user interface on the computer, the graphical user interface including at least a user interface element whose rendering is at least in part determined by source data, the method comprising:
 obtaining one or more parameters for at least one transform to the source data, wherein the source data in part defines source image pixels for displaying a raster image;
 modifying the source data as directed by the one or more parameters to produce transformed source data, wherein the step of modifying the source data as directed by the one or more parameters to produce the transformed source data includes for each of a plurality of the source image pixels:
  obtaining from the plurality of the source image pixels a source pixel having a first source color channel, a second source color channel and a third source color channel, each of which contains a color channel value;
  multiplying the first source color channel value by a first scalar to yield a composite first color channel value;
  multiplying the second source color channel value by a second scalar to yield a composite second color channel value;
  multiplying the third source color channel value by a third scalar to yield a composite third color channel value;
  creating an output pixel having a first output color channel, a second output color channel and a third output color channel, each of which contains a color channel value, wherein the first output color channel value equals the first composite color channel value, the second output color channel value equals the second composite color channel value and the third output color channel value equals the third composite color channel value; and
  storing the output pixel on the computer to form the transformed source data; and
 storing the transformed source data on the computer to enable rendering of the user interface element using the transformed source data rather than the original source data.

24. The computer-readable medium of claim 23, wherein the method further comprises rendering the user interface element using the transformed source data.

25. The computer-readable medium of claim 23, wherein the step of modifying the source data includes modifying the brightness of a plurality of the source image pixels to produce the transformed source data.

26. The computer-readable medium of claim 23, wherein the step of modifying the source data includes modifying the contrast of a plurality of the source image pixels to produce the transformed source data.

27. The computer-readable medium of claim 23, wherein the step of modifying the source data includes merging the source data with data for a secondary image to produce the transformed source data.

28. The computer-readable medium of claim 23, wherein the source data in part includes audio data.

29. The computer-readable medium of claim 23, wherein the source data in part includes vector image data.

30. The computer-readable medium of claim 23, wherein the source data in part includes animated metadata.

31. A computer-readable medium having computer-executable instructions for a computer to perform a method for dynamically modifying the rendering behavior of a graphical user interface on the computer, the graphical user interface including at least a user interface element whose rendering is at least in part determined by source data, the method comprising:

obtaining one or more parameters for at least one transform to the source data, wherein the source data in part defines source image pixels for displaying a raster image;

modifying the source data as directed by the one or more parameters to produce transformed source data, wherein the step of modifying the source data to produce the transformed source data includes for each of a plurality of the source image pixels:

obtaining from the plurality of the source image pixels a source pixel having a first source color channel, a second source color channel and a third source color channel, each of which contains a color channel value;

creating a first pixel, a second pixel and a third pixel, each having a first color channel, a second color channel and a third color channel and each respective color channel containing a color channel value, wherein the values of the first pixel color channels correspond respectively to the first source color channel value, the second source color channel value and the third source color channel value, wherein the values of the second pixel color channels correspond respectively to the first pixel color channel values shifted in a desired direction by one color channel position; and wherein the values of the third pixel color channels correspond respectively to the first pixel color channel values shifted in the desired direction by two color channel positions;

creating a composite first color channel value by multiplying the first color channel value of the first pixel by a first scalar, multiplying the first color channel value of the second pixel by a second scalar and multiplying the first color channel value of the third pixel by a third scalar and summing the results thereof to yield the composite first color channel value;

creating a composite second color channel value by multiplying the second color channel value of the first pixel by the first scalar, multiplying the second color channel value of the second pixel by the second scalar and multiplying the second color channel value of the third pixel by the third scalar and summing the results thereof to yield the composite second color channel value;

creating a composite third color channel value by multiplying the third color channel value by the first scalar, multiplying the third color channel value of the second pixel by the second scalar and multiplying the third color channel value of the third pixel by the third scalar and summing the results thereof to yield the composite third color channel value;

creating an output pixel having a first output color channel value, a second output color channel value and a third output color channel value, wherein the first output color channel value equals the first composite color channel value, the second output color channel value equals the second composite color channel value and the third output color channel value equals the third composite color channel value; and storing the output pixel on the computer to form the transformed source data; and storing the transformed source data on the computer to enable rendering of the user interface element using the transformed source data rather than the original source data.

32. The computer-readable medium of claim 31, wherein the desired direction is to the left.

33. The computer-readable medium of claim 31, wherein the desired direction is to the right.

34. The computer-readable medium of claim 31, wherein the first scalar, the second scalar and the third scalar each have a value from between −2 and 2.

35. A computer-readable medium having computer-executable instructions for a computer to perform a method for modifying a themeable graphical user interface having a plurality of user interface elements each of whose rendering is at least in part determined by respective source data, the method comprising:

obtaining one or more parameters for globally modifying each respective source data, wherein the respective source data in part defines one or more data elements;

modifying the respective source data as directed by the one or more parameters to produce for each respective source data respective transformed source data, wherein modifying the respective source data includes for each of said one or more data elements:

obtaining from the one or more data elements a source element having a plurality of channels, wherein each of said plurality of channels contains at least one channel value;

multiplying said at least one channel value by a scalar to yield at least one composite channel value;

creating an output element having a plurality of output channel values, wherein said plurality of output channel values includes said at least one composite channel value; and storing the output element on the computer to form the respective transformed source data; and storing the respective transformed source data on the computer to enable rendering the plurality of user interface elements each using the respective transformed source data.

36. The computer-readable medium of claim 35, wherein the source data in part includes audio data.

37. The computer-readable medium of claim 35, wherein the source data in part includes vector image data.

38. The computer-readable medium of claim 35, wherein the source data in part includes animated metadata.

39. The computer-readable medium of claim 35, wherein the method further comprises rendering the plurality of user interface elements using the respective transformed source data.

40. A computer-readable medium having computer-executable instructions for a computer to perform a method for creating a color-shifted image from source data defining source image pixels viewable using a computer, the method comprising for each of a plurality of the source image pixels:

obtaining from the plurality of the source image pixels a source pixel having a first source color channel, a second source color channel and a third source color channel, each of which contains a color channel value;

creating a first pixel, a second pixel and a third pixel, each having a first color channel, a second color channel and a third color channel and each respective color channel containing a color channel value, wherein the values of the first pixel color channels correspond respectively to the first source color channel value, the second source color channel value and the third source color channel value, wherein the values of the second pixel color channels correspond respectively to the first pixel color channel values shifted in a desired direction by one color channel position; and wherein the values of the third pixel color channels correspond respectively to the first pixel color channel values shifted in the desired direction by two color channel positions;

creating a composite first color channel value by multiplying the first color channel value of the first pixel by a first scalar, multiplying the first color channel value of the second pixel by a second scalar and multiplying the first color channel value of the third pixel by a third scalar and summing the results thereof to yield the composite first color channel value;

creating a composite third color channel value by multiplying the second color channel value of the first pixel by the first scalar, multiplying the second color channel value of the second pixel by the second scalar and multiplying the second color channel value of the third pixel by the third scalar and summing the results thereof to yield the composite second color channel value;

multiplying the third color channel value of the second pixel by the second scalar and multiplying the third color channel value of the third pixel by the third scalar and summing the results thereof to yield the composite third color channel value;

creating an output pixel having a first output color channel value, a second output color channel value and a third output color channel value, wherein the first output color channel value equals the first composite color channel value, the second output color channel value equals the second composite color channel value and the third output color channel value equals the third composite color channel value; and storing the output pixel on the computer to form the color-shifted image.

41. The computer-readable medium of claim 40, wherein the method further comprises displaying the color-shifted image on the computer.

42. The computer-readable medium of claim 40, wherein the desired direction is to the left.

43. The computer-readable medium of claim 40, wherein the desired direction is to the right.

44. The computer-readable medium of claim 40, wherein the first scalar, the second scalar and the third scalar each have a value between −2 and 2.

* * * * *